United States Patent Office 3,518,021
Patented June 30, 1970

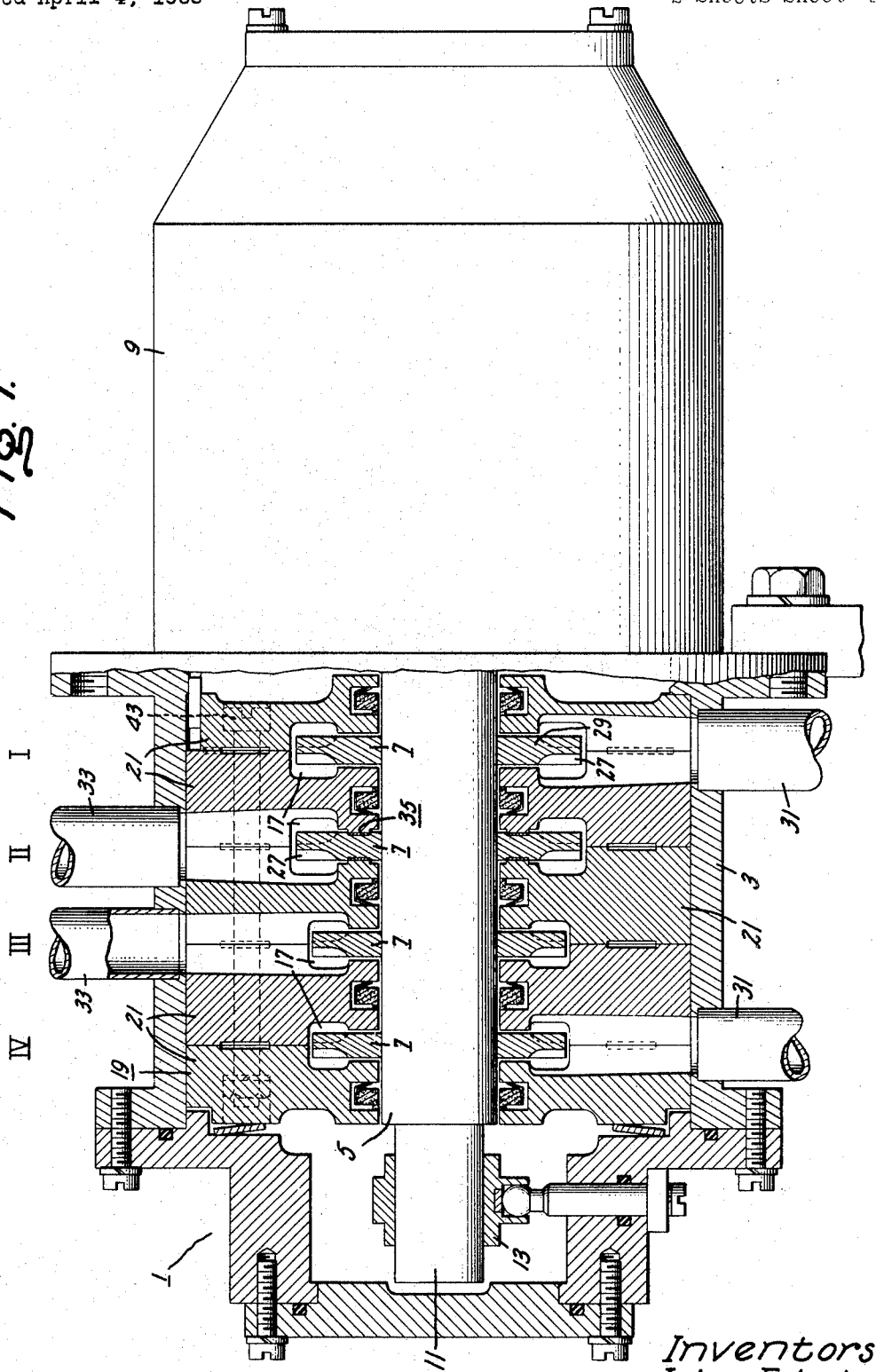

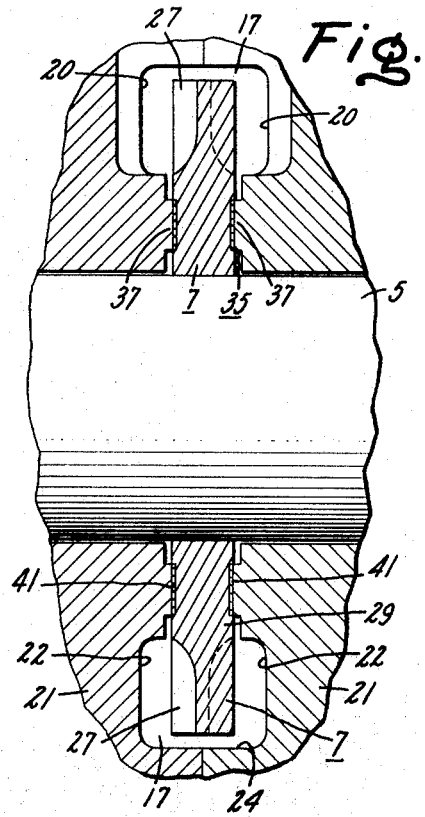
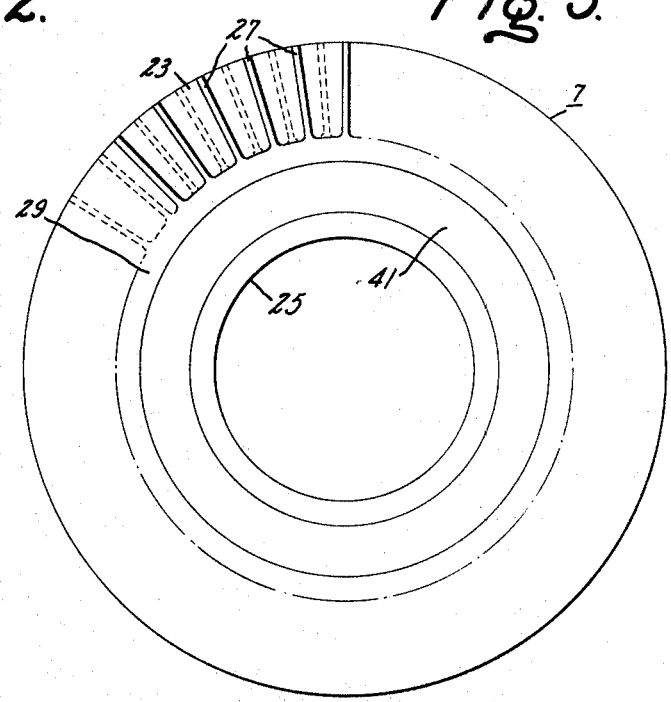
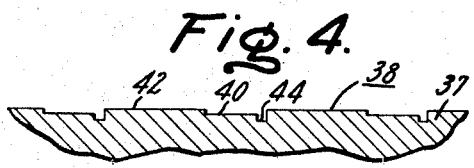
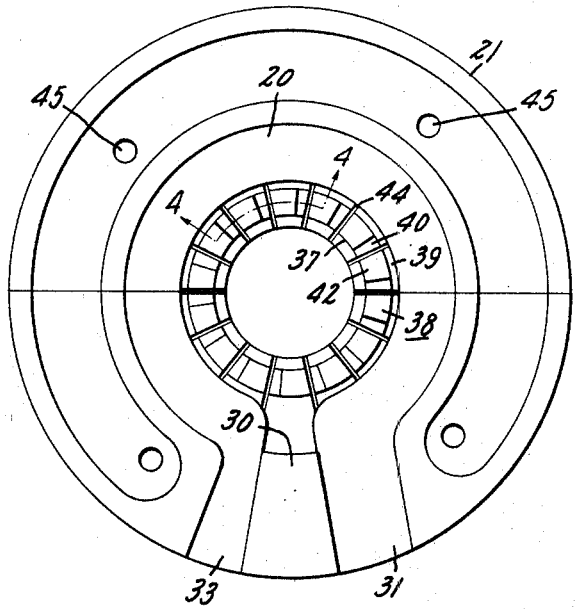

3,518,021
THRUST BEARING FOR COMPRESSOR
John E. Lake and Richard C. Elwell, Schenectady, N.Y., assignors to General Electric Company, a corporation of New York
Filed Apr. 4, 1968, Ser. No. 718,830
Int. Cl. F04d 17/12, 29/06; F16c 32/00
U.S. Cl. 415—172                                                5 Claims

ABSTRACT OF THE DISCLOSURE

A multi-stage, high speed gas compressor of the dynamic type includes an external housing wherein is mounted a motor driven rotor having a plurality of spaced impellers mounted thereon. Each impeller is disposed in a chamber constituting a stator assembly, each stator chamber and associated impeller comprising a separate compressor stage. Inlets and outlets are provided for each stage to interconnect them in a desired manner. A thrust bearing arrangement for the rotor is integrated with one of the compressor stages. The thrust bearing is formed in a wall of a stator chamber. The sides of the associated impeller between the blade root and the rotor are formed to serve as the thrust runner for the thrust bearing. The thrust bearing arrangement utilizes the working fluid in the compressor as a lubricant.

---

This invention relates to thrust bearings and, more particularly, to a thrust bearing arrangement for the rotor of a high speed gas compressor.

The invention herein described was made in the course of, or under a contract, with the Department of the Air Force.

High speed gas compressors are often used in cyrogenic refrigerator applications. In such applications, a rotating compressor shaft is normally suspended on bearings which are lubricated by a liquid lubricant. The use of a liquid lubricant creates life-limiting problems in that the liquid lubricant tends to migrate to low temperature regions of the refrigeration cycle where it degrades performance or prevents operation. Furthermore, the bearings do not adequately prevent wear of continuously running mating parts, or excessive heating of the compressor working fluid.

We have found that in turbomachinery such as compressors, gas bearings may be used wherein the working fluid is used as the lubricant. The use of the working fluid as a lubricant eliminates many of the compressor life-limiting problems. For example, the potential contaminant sources are reduced to impurities in the gas supply, component wear debris, the evolution of absorbed materials from internal surfaces of the relatively warm components, and the evaporation of the materials (or volatile fractions thereof) used in component construction. The problem of contaminants arising from absorbed material and evaporation of the materials of construction can be minimized by careful selection of materials and adequate cleaning and outgassing operations in manufacture. Impurities in the gas supply can be controlled by initial purification of the charging fluid.

With regard to component wear, the physical contact of rubbing or sliding parts is completely eliminated if externally pressurized bearings are used. However, we have found that for increased reliability and reduced complexity, self-acting gas bearings are preferred since they do not require an external gas supply with its attendant plumbing, auxiliary compressors or other sources of pressurized gas, increased power consumption and controls. With self-acting gas bearings, as used in the compressor, rubbing and sliding may be essentially eliminated during start and stop transients. Even at low rotating speeds, the fluid film generated in the bearings can be adequate to support a load.

Another problem with respect to the use of high speed rotating machinery occurs when the shaft rotates at, or near, the natural transverse vibration frequencies, or "bending criticals," as they are often called. Occurrence of these frequencies in the operating speed range often results in damage or undesirably high vibration levels. Since the speed at which these frequencies occur are generally inversely proportional to the square of shaft length, the effect of thrust bearings on shaft length must be considered in the design of such machinery.

It is, therefore, an object of this invention to provide novel self-acting thrust bearings for the rotor of a compressor.

It is another object of this invention to provide a self-acting thrust bearing for the rotor of a gas compressor which utilizes the working fluid as a lubricant.

It is another object of this invention to provide self-acting thrust bearings for the rotor of a compressor which serve to minimize overall shaft length.

With this in mind, we have developed the novel thrust bearing of the present invention to absorb axial thrust on the compressor rotor. The compressor is a multi-stage high speed gas compressor of the dynamic type. It includes an external housing wherein is mounted a motor-driven shaft having a plurality of spaced impellers mounted thereon. Each impeller is disposed in a chamber forming a stator assembly, each stator chamber and associated impeller comprising a separate compressor stage. Inlets and outlets are provided for each compressor stage and interconnect the stages in a desired manner.

In accordance with one aspect of our invention, a self-acting thrust bearing is provided for the rotor, which thrust bearing is integrated with one of the compressor stages. The thrust bearing is formed in a wall of a stator chamber and uses the working fluid of the compressor as a lubricant. The sides of the associated impeller between the blade root and shaft are formed to serve as a thrust runner for the thrust bearing.

The particular advantage of integrating the thrust bearing with a compressor stage is that it permits a shorter and simpler rotor design which saves weight and costs less to manufacture, but, more importantly, raises the speeds at which some of the natural frequencies, or "bending criticals," occur. In lightweight, very high speed rotating machines this is quite an important advantage since, again, occurrence of these frequencies in the operating speed range can often result in great damage or an undesirably high vibration level.

Other objects and advantages of the present invention may better be understood by reference to the following detailed description when taken in conjunction with the following drawings in which:

FIG. 1 is a cross section view of a compressor including our thrust bearing arrangement;

FIG. 2 is an enlarged view of the thrust bearing portion of the compressor;

FIG. 3 is a plan view of the stator including an integral thrust bearing;

FIG. 4 is an unfolded, enlarged section view taken along line 4—4 of FIG. 3; and FIG. 5 is a plan view of an impeller including an integral thrust runner formed therein.

FIG. 1 shows a multi-stage, high-speed gas compressor 1 of the dynamic type for application, for example, as a component in a closed cycle cryogenic refrigerator system. The particular compressor shown has four compression stages of the regenerative type, although no special significance is placed in the number of stages chosen. Compressor 1 comprises an external housing 3 wherein is mounted a rotor 5 having a plurality of spaced impellers 7 mounted thereon. The rotor 5 is driven by a suitable motor 9 which forms no part of the present invention. The extremities 11 of rotor 5 are seated in suitable journal bearings 13 within housing 3. In the particular embodiment shown, the bearings take the form of journal bearings located at each end of the rotor 5 and may be, for example, of the three-segment, tilting-pad type.

Each impeller 7 is disposed in a chamber 17 in a surrounding stator assembly 19. Stator assembly 19 comprises a series of individual stator members 21 having cutout portions 20 which cooperate with portions 20 of adjacent stator members 21 to form each individual chamber 17. Referring to FIG. 2, each chamber 17 includes a pair of side walls 22 and an end wall 24. Each compressor stator member 21 comprises a disc-like member which is split along its diameter to permit assembly about rotor 5. Each chamber 17 so formed by adjacent stator members 21 and the impeller 7 associated therewith combine to comprise a separate compressor stage in the compressor 1. Thus, in the particular embodiment shown, four separate compressor stages are formed by a stator assembly comprising five stator members 21. For ready reference, the compressor stages are designated I, II, III, and IV.

Each impeller 7, best seen in FIG. 5, comprises a disc-like member 23 having a central aperture 25 therein. The outer periphery of each impeller 7 includes a series of spaced radial vanes or blades 27, including a blade root portion 29. In FIG. 2, each impeller 7 rotates in the open annular chamber 17 which is larger than the impeller cross section so that fluid flow is free to enter or leave impeller blades 27 around nearly the entire periphery thereof. At one section of each stator chamber 17 the annular cross section is reduced to a close running clearance around the impeller blades 27. This section forms the stripper 30 as shown in FIG. 3. Its function is to separate the inlet and discharge or outlet ports 31 and 33, respectively, thereby forcing the flow out the outlet port 33.

It has been found that the number of stages for the compressor is limited by consideration of rotor bending resonances. The operating speed of the rotor must be substantially different than the critical speed, that is, the speed at which the first bending mode of the shaft occurs. The first bending mode is the lowest frequency at which the rotor naturally resonates and is to be avoided in well-designed machinery. The first critical speed of a rotor is almost identical with natural vibration frequency which the stationary rotor may assume, and, therefore, may be given by the equation $$f = 7.7(d/l^2)\sqrt{E/w_1}$$

where $f$=critical frequency, cycles per second; $d$=shaft diameter, inches; $l$=span between journal bearings; $E$=modulus of elasticity rotor material, p.s.i.; $w_1$=weight of 1 cubic inch of rotor material, pounds. It can be seen that the critical speed is inversely proportional to the square of the rotor length. Thus, the design of any thrust bearing for a multi-stage compressor should take into consideration the effective rotor length so that the first bending mode is safely outside the operating speed range.

In order to minimize the effective rotor length, a novel thrust bearing arrangement 35 (FIG. 1) is provided which is integrated with compressor stage II. The thrust bearing arrangement 35 includes thrust bearings 37, each of which is formed as an integral part of an individual stator member 21 in stage II. As seen best in FIGS. 3 and 4, each thrust bearing comprises individual Rayleigh-type step bearings 38 in an annular array, which is machined or etched in a face 39 of each of the stators 21, which faces 39 form sidewalls of the chamber 17 for compressor stage II (FIG. 1). The Rayleigh step bearing is a parallel-surface thrust bearing of the composite bearing surface type. Each step bearing comprises two bearing surfaces, designated 40 and 42, respectively, in different planes. Each step bearing 38 is separated from adjacent step bearings by a groove or vent 44 which extends from the internal diameter to the outside diameter to prevent thrust loading due to a pressure differential between the two sides of the thrust runner, to be described, in which the bearings are seated. Although a Rayleigh-type bearing is shown, it is to be understood that the invention is not limited thereto, and any suitable parallel-surface thrust bearing may be used. For example, a spiral-groove-type bearing may be utilized. In fact, the spiral-groove-type bearing actually is preferred to the Rayleigh step bearing in theoretical performance, but the step bearing is shown here because it has been found more compatible with the rest of the machine with regard to fabrication and pressure equalization. The step-type bearing is more easily fabricated as required for this particular application where the split compressor stator members 21 are assembled around the rotor 5.

As can best be seen in FIG. 5, the impeller 7 for compressor stage II is formed with a thrust runner 41 machined on each impeller face and concentric with the central aperture 25. Each thrust runner 41 is positioned between the impeller blade root 29 and the central aperture 25. In a preferred form, the surfaces of the thrust runner 41 are coated with tungsten carbide or an equivalent material.

The entire rotor-stator assembly is preassembled before being positioned in compressor housing 3. This is accomplished by first attaching impeller members 7 about the rotor shaft at spaced locations thereon before stator assembly 19 is assembled about rotor 5. The individual stator members 21 are then positioned about rotor 5, stator members 21 forming chambers 17 for impellers 7. Thrust bearings 37 on stator members 21 comprising stage II are then adjacent to the thrust runners 41 of the impeller 7. A plurality of bolts 43 are inserted in suitable apertures 45 in the stator members to form an integral stator assembly in which there will be no relative movement between individual stator members. The entire assembly is then fitted into housing 3.

As was stated previously, the working fluid in gas compressor 1 acts as a lubricant for the thrust bearing arrangement 35 so that problems and disadvantages of using a liquid lubricant for bearing lubrication may be eliminated. Additionally, the integration of thrust bearing 37 and thrust runner 41 with the second compressor stage minimizes the effective rotor length. Since the speed at which the natural frequencies, or bending criticals, occur are inversely proportional to the square of the rotor length, the shorter rotor 5 results in a higher speed at which the natural frequencies occur. In a design produced in accordance with the present invention, we have produced a compressor wherein the operating range of speeds for the rotor is substantially below the occurrence of the first bending critical. In such a compresor, the rotor was approximately eight percent shorter than what would have been necessary if a conventional separate thrust runner was mounted on the shaft. Since the first natural frequency is inversely proportional to the square of the rotor length, the eight percent reduction in rotor length raised this frequency about 18 percent, which is a significant amount.

Although the thrust bearings themselves in the particular embodiment shown are of the Rayleigh-step type, there is nothing particularly unique about the selection for this application. Several other types of parallel-surface thrust bearings, including the spiral groove, taper-land, or pocket-step type may be used, but, as indicated, the Rayleigh-step type was chosen mainly for manufacturing considerations.

While the present invention has been described with specificity, it is the aim of the appendant claims to cover all such equivalents and variations that come within the true spirit and scope of the foregoing disclosure.

What we claim as new and desire to secure by Letters Patent of the United States of America is:

1. In a gas compressor including a housing having a stator assembly disposed therein including a plurality of spaced chambers, each comprising a pair of side walls and an end wall, a motor driven shaft extending through a central aperture in said stator assembly, a plurality of disk-like impellers each including opposed sides and having annularly spaced blades at the periphery thereof spacedly mounted on said shaft, each of said impellers being disposed in a respective one of said chambers, each of said impellers and the chamber associated therewith comprising a separate compressor stage, and an inlet and outlet for each compressor stage, a thrust bearing assembly integral with one of the compressor stages for absorbing the axial thrust from the rotor shaft comprising a pair of annular thrust bearings, each formed in a respective side wall of one chamber of one of said compressor stages, and a pair of annular thrust runner surfaces, each formed in a respective side of the impeller of said one compressor stage, each of said thrust runner surfaces being formed to accommodate a respective one of said bearings.

2. The thrust bearing assembly as recited in claim 1 wherein the working fluid of the gas compressor comprises the lubricant for the thrust bearing assembly.

3. The thrust bearing assembly as recited in claim 1 wherein each of said annular thrust bearings comprise a bearing of the self-acting type.

4. The thrust bearing assembly as recited in claim 3 wherein each of said thrust runner surfaces comprise an annular face on a respective side of the impeller of said one compressor stage.

5. The thrust bearing assembly as recited in claim 4 wherein each of said bearings is a step bearing comprising a plurality of sections, each section having two bearing surfaces lying in different planes, each of said sections separated from adjacent sections by a groove which extends from the internal to the external diameter thereof to prevent thrust loading due to a pressure differential between the two sides of the thrust runner surfaces.

References Cited

UNITED STATES PATENTS

| | | | |
|---|---|---|---|
| 832,230 | 10/1906 | Bettis | 103—112 |
| 1,065,732 | 6/1913 | Schneible | 103—112 |
| 2,086,681 | 7/1937 | Scott | 308—8.2 |
| 2,468,246 | 4/1949 | Thayer | 103—96 |
| 3,357,361 | 12/1967 | Scott | 103—84 |

FOREIGN PATENTS 2,802　　1907　　Great Britain.

SAMUEL FEINBERG, Primary Examiner

U.S. Cl. X.R.

308—8, 241; 415—198